April 21, 1931.  P. MacGAHAN  1,801,778

POINTER FOR ELECTRICAL MEASURING INSTRUMENTS

Filed Feb. 4, 1929

INVENTOR
Paul MacGahan

BY Wesley S. Carr
ATTORNEY

Patented Apr. 21, 1931

1,801,778

UNITED STATES PATENT OFFICE

PAUL MacGAHAN, OF ORANGE, NEW JERSEY, ASSIGNOR TO WESTINGHOUSE ELECTRIC & MANUFACTURING COMPANY, A CORPORATION OF PENNSYLVANIA

POINTER FOR ELECTRICAL MEASURING INSTRUMENTS

Application filed February 4, 1929. Serial No. 337,277.

My invention relates to electrical measuring instruments and particularly to pointers therefor, and to means for constructing the pointers.

My invention has for an object to so devise or construct a pointer or index needle that it will be of minimum weight and of such strength as to withstand without damage the shocks to which such instruments are often subjected.

Another object of my invention is to provide means for constructing a pointer, with the exception of the adjustable counterweights, in one integral piece.

My invention, may be more readily understood if the accompanying drawings are referred to in connection with the following drawings, in which Fig. 1 is a plan view of my assembled pointer.

Figs. 4 to 8 inclusive are plan and side views of my pointer showing it in various stages of manufacture.

Figure 1:
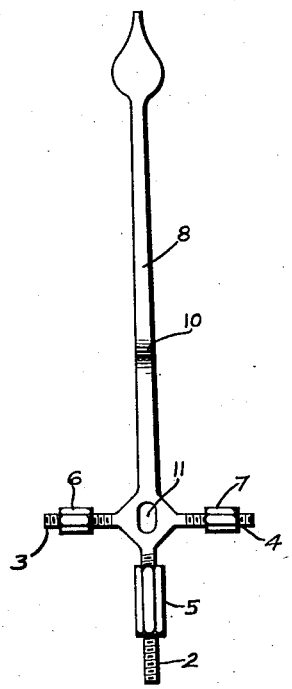
Figure 2:
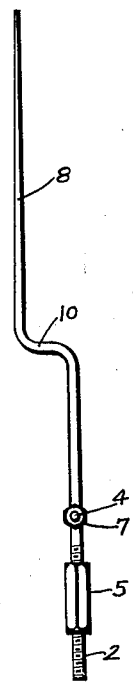
Fig. 2 is a side view of the pointer shown in Fig. 1.
Figure 3:
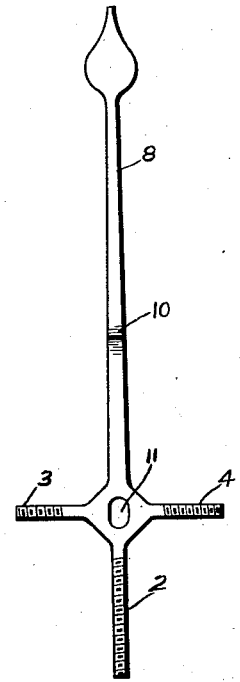
Fig. 3 is a plan view of my pointer without the adjustable counter weights.
Figure 4:
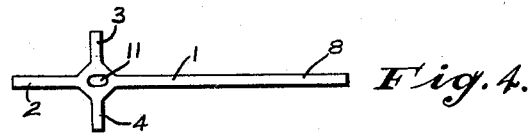
Figure 5:
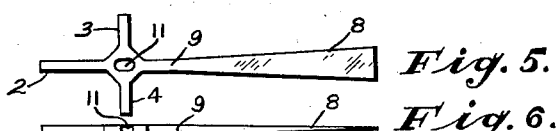
Figure 6:
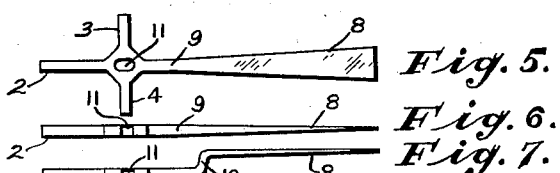
Figure 7:
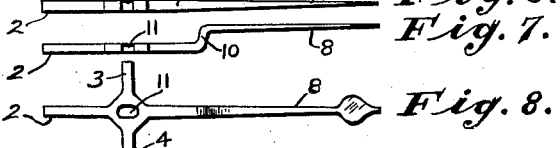
Figure 8:
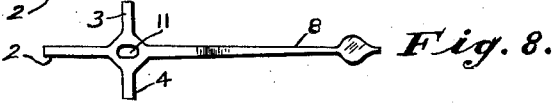

A sheet of light weight, but tough, material, such a duraluminum, of the proper thickness is cut or stamped to form a cross 1, as shown in Fig. 4. The rear arm 2 and side arms 3 and 4 are provided for supporting adjustable counter-weights 5 and 6 and 7, respectively, when the manufacturing process is completed and the pointer is put into service. The long arm 8 of the cross 1 is ultimately shaped to form the point as shown in Figs. 1 to 3, inclusive, by first rolling the arm 8 to a taper from the vicinity of the point 9 outwardly toward the end of the pointer. Secondly, the arm 8 is bent, at 10 to have portions in offset parallel planes as shown in Fig. 7. Thirdly, the tapered flattened arm 8 is trimmed or cut preferably on a punching machine, to a desired shape as shown in Fig. 8. The arms 2, 3 and 4 are then threaded for the reception of their respective counter-weights and the latter are assembled with the pointer.

The pointer is provided with an opening 11 for the spindle or shaft of the measuring instrument with which it is to be used.

My pointer provides an ideal indicator for measuring instruments, both from the standpoint of ease of manufacture and utility. Its unitary structure, light weight and excellent inherent integral balance make it particularly useful in connection with delicate and light weight movements for electrical measuring instruments.

Although I have described my novel pointer as especially applicable to electrical measuring instruments, I do not limit its use to that purpose as it is obvious that it may be applied to other types of instruments with equal facility.

I claim as my invention:

1. A pointer for a measuring instrument comprising a unitary cruciform member having a tapered arm, the opposite surfaces providing said taper being substantially parallel to the plane of the movement of said pointer.

2. A pointer comprising a long arm and shorter counter balancing arms, the thickness of said long arm being reduced uniformly from an intermediate portion to its outer end substantially normal to the plane of its movement.

3. An instrument pointer comprising a single, homogeneous, cruciform, sheet-material body having three relatively short exteriorly screw-threaded counter-balance arms for the reception of interiorly screw-threaded weights adjustable therealong, an apertured web-like center portion at the juncture of said arms for the reception of the pointer staff and a main relatively long pointer arm projecting from said center portion, said main arm being of rectangular cross-sectional area substantially throughout having portions of all of its surfaces converging toward its outer end and a web-like index portion extended in opposite directions substantially parallel to its plane of movement.

4. An instrument pointer comprising a single, homogeneous, cruciform, sheet-material body having three relatively short exteriorly screw-threaded counter-balance arms for the reception of interiorly screw-threaded weights adjustable therealong, an apertured web-like center portion at the juncture of said arms for the reception of the pointer staff and a main relatively long pointer arm projecting from said center portion, said main arm being of rectangular cross-sectional area substantially throughout having portions of all of its surfaces converging toward its outer end and a web-like index portion extended in opposite directions substantially parallel to its plane of movement, said main arm also having portions in offset-plane relation.

5. An instrument pointer comprising a longitudinal section initially of uniformly-thick sheet material pressed to be of decreasing thickness toward its outer end substantially normal to the plane of the pointer movement and shaped to include a homogeneously integral target portion projecting laterally therefrom.

6. An instrument pointer comprising a longitudinal section initially of uniformly-thick sheet material pressed to have plane front and rear surfaces converging toward its outer end and shaped to include a laterally-projecting homogeneously-integral target portion.

7. An instrument pointer comprising a longitudinal section initially of uniformly-thick sheet material pressed to be of decreasing thickness toward its outer end and shaped to include a laterally-projecting homogeneously-integral target portion.

8. An instrument pointer comprising a longitudinal section initially of uniformly-thick sheet material pressed to be of decreasing width and thickness toward its outer end and shaped to include a homogeneously integral target portion, said section and its target portion being of rectangular cross-sectional area.

9. An instrument pointer comprising a longitudinal section initially of uniformly-thick sheet material pressed to be of decreasing thickness toward its outer end and shaped to include a laterally-extending target section homogeneously integral with said longitudinal section.

10. An instrument pointer comprising a longitudinal section initially of uniformly-thick sheet material pressed to be of decreasing width and thickness toward its outer end and shaped to include a laterally-extending target section homogeneously integral with said longitudinal section.

11. An instrument pointer comprising a longitudinal section initially of uniformly-thick sheet material pressed to be of decreasing thickness toward its outer end and shaped to include a laterally-projecting target section homogeneously integral with said longitudinal section.

12. An instrument pointer comprising a longitudinal section initially of uniformly-thick sheet material pressed to be of decreasing thickness toward its outer end and shaped to include a sheet-material laterally-projecting target section homogeneously integral with said first section and of decreasing thickness toward the outer end of the pointer.

In testimony whereof, I have hereunto subscribed my name this 25th day of January, 1929.

PAUL MacGAHAN.